Sept. 15, 1964 J. T. TOMAN 3,148,593
FLUID ACTUATED RECIPROCATING MECHANISM
AND CONTROLS THEREFOR
Filed June 4, 1962 3 Sheets-Sheet 2
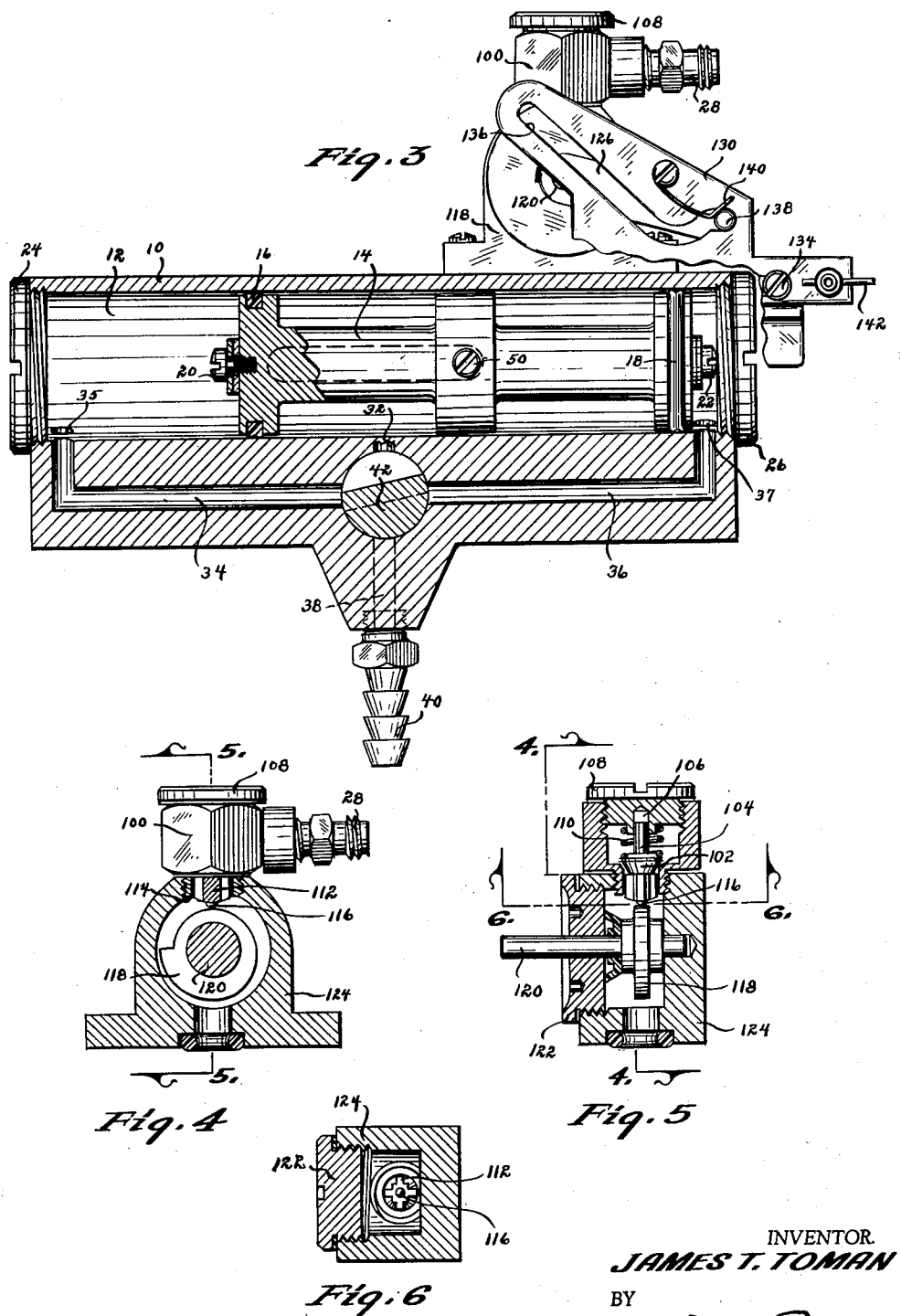
INVENTOR.
JAMES T. TOMAN
BY
Talbert Dick & Barley
ATTORNEYS
WITNESS
NORMAN G. TRAVISS Sept. 15, 1964  J. T. TOMAN  3,148,593
FLUID ACTUATED RECIPROCATING MECHANISM
AND CONTROLS THEREFOR
Filed June 4, 1962  3 Sheets-Sheet 3

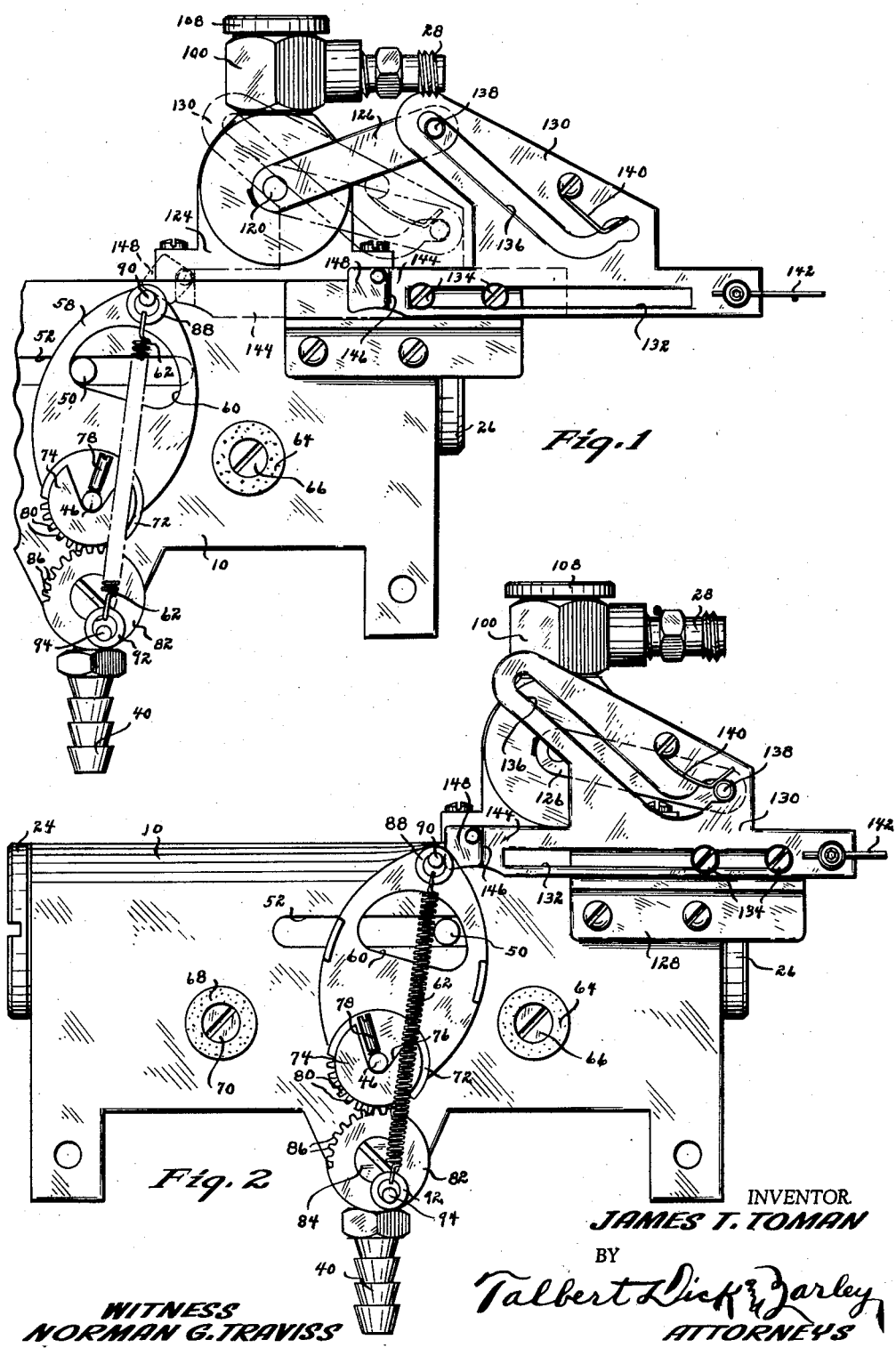

INVENTOR.
JAMES T. TOMAN
BY
Talbert Dick & Farley
ATTORNEYS

WITNESS
NORMAN G. TRAVISS

United States Patent Office 3,148,593
Patented Sept. 15, 1964

3,148,593
FLUID ACTUATED RECIPROCATING MECHANISM AND CONTROLS THEREFOR
James T. Toman, 7705 Palm Drive, Des Moines, Iowa, assignor of one-half to David H. Lipsey
Filed June 4, 1962, Ser. No. 199,742
9 Claims. (Cl. 91—331)

This invention relates to novel reciprocating mechanisms actuated by fluid pressure and having controls governing the motion thereof. In a more specific aspect the present invention relates to a device capable of supplying reciprocating motion under the impulse of a fluid under pressure which includes manually operable means to control the rate of flow of said fluid.

One use for which the invention is especially well suited is that of supplying motion to reciprocating members such as vehicle windshield wipers and the like. Although the invention will be described in connection with such members it is to be understood that its use is not limited solely to this usage.

It is desirable that the movement of vehicle windshield wipers be adjustable between several predetermined speeds, or continuously adjustable between a predetermined maximum speed and the "off" position, or zero speed. It is also desirable that the wiper blades be returned to an initial position when turned off by the usual manual switch regardless of their position at the time the switch is moved to the "off" position by the operator. In windshield wipers wherein a fluid under pressure is pumped into a cylinder to cause movement of a piston the flow of the fluid is normally controlled by a valve interposed at a convenient location in the line through which the fluid is supplied. When the valve is closed, the fluid ceases to flow to the piston supplying motion to the wiper stops. Obviously the wiper blades will not be returned to their initial position when the piston stops if the valve is closed when the blades are at other than their initial position.

Some of these problems were overcome by the teachings of my issued United States Letters Patent No. 2,945,480 under date of July 19, 1960, on a fluid pressure actuated reciprocating mechanism, and especially in my co-pending application, Serial No. 164,825, filed January 8, 1962, on a fluid actuated reciprocating mechanism and control therefor. The chief problem, however, not solved by these two inventions, was that while the mechanism would return to its original positions when shut off, it would not move to a position beyond that of the normal operating reciprocation.

In the matter of actuating the arms of automotive windshield wipers, the normal reciprocation must be such that the wipers will not travel an arc so great that they would strike the lower frame area of the windshield. However, after the device has been shut off, it is highly desirable that the windshield wipers do extend their movement beyond the normal sweep so that they will engage and/or "park" into the lower frame portion of the windshield.

Therefore, one of the principal objects of this invention is to provide a fluid pressure actuated means for moving the windshield wiper arms of automotive vehicles, that will, when the means is turned off, "park" the wipers adjacent the frame of the windshield.

Another object is the provision of novel control means for fluid actuated mechanisms.

A further object is to provide a fluid actuated reciprocating mechanism having control means allowing continuous adjustment of the speed of reciprocating motion and causing the mechanism to stop at a predetermined position irrespective of its position at the time the control means are moved to the "off" position.

Other objects are: to provide apparatus movable under the impulse of a fluid under pressure and having manually operable control means movable to an open position to cause motion of said apparatus and movable to a fully closed position to stop the motion of said apparatus by contact of a portion of the apparatus with a portion of the control means subsequent to an initial manual movement of the control means by the operator; to provide novel cam-actuated control means for hydraulic apparatus; to provide apparatus reciprocally movable under fluid pressure and having control means comprising a manually operable cam for opening and closing a valve and including means for causing the apparatus to stop automatically at a predetermined position to the parts thereof; and, to provide apparatus of the aforementioned type which is simple in construction, economical in manufacture, and reliable and durable in use.

These and other objects will be apparent to those skilled in the art.

My invention consists in the construction, arrangements, and combination, of the various parts of the device, whereby the objects contemplated are attained as hereinafter more fully set forth, specifically pointed out in my claims, and illustrated in the accompanying drawings, in which:

FIG. 1 is a front view of the control position of the device when in operation.

FIG. 2 is a front view of the control portion of the device as it is being shut off.

FIG. 3 is a longitudinal sectional view of the device taken on line 3—3 of FIG. 10.

FIG. 4 is a vertical sectional view of the upper valve portion of the device and is taken on line 4—4 of FIG. 5.

FIG. 5 is a vertical sectional view of the upper valve means taken on line 5—5 of FIG. 4 and more fully illustrates, its construction.

FIG. 6 is a cross-sectional view of the upper valve means taken on line 6—6 of FIG. 5.

Figure 7:
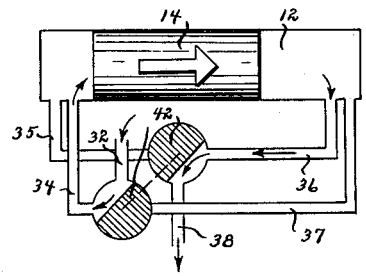
FIG. 7 is a diagrammatic view of the valve system when the piston is moving to the right.

Referring now to the drawings, wherein like numerals denote like elements throughout the several views, the mechanism is generally supported by and partly contained within base 10. Extending longitudinally through an upper portion of base 10 is a hollow cylinder or bore 12. Freely movable within bore 12 is a piston 14 supported at its ends by gaskets 16 and 18 which also act as fluid seals. The motion of piston 14 is limited by screws 20 and 22 in each of its ends contacting the inner sides of end caps 24 and 26 which are threaded into each end of bore 12 to form a fluid-tight seal.

A fluid, which may be either a liquid or a gas, is alternately supplied to the ends of bore 12 to cause movement of piston 14. The fluid is supplied under pressure from a convenient source, such as the usual oil reservoir or air compression line of a vehicle, and enters housing 10 through an inlet line 28. After passing through a valve arrangement, to be described later, the fluid is introduced into a hollow chamber 30 communicating with inlet line 28 by means of inlet passageway 32 in base 10. Chamber 30 communicates with one end of bore 12 by passageways 34 and 35 in base 10, with the other end of bore 12 by passageways 36 and 37 in base 10. An outlet passageway 38 in base 10 leads from chamber 30 to an outlet line 40. A generally cylindrical valve member 42 is rotatably mounted within chamber 30 by a bearing member 44 on one of its ends and a shaft 46 on the other. Shaft 46 extends from valve member 42 through cap 48 which is threaded into base 10 to seal the end of chamber 30.

Figure 9:
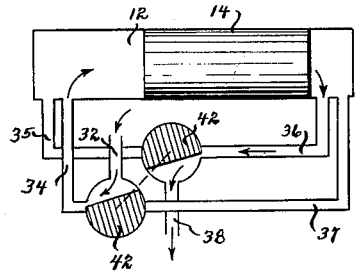
FIG. 9 is a diagrammatic view of the valve system after the control means has been shut off.
Figure 10:
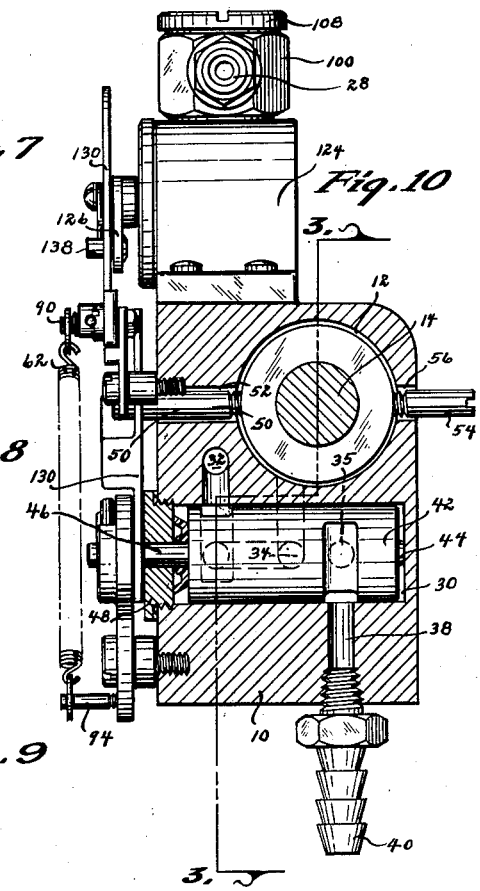
FIG. 10 is a side vertical sectional view of the device.

A shaft 50 extends from a central portion of piston 14 through a slot 52 in base 10 substantially parallel with the longitudinal axis of bore 12. A second shaft 54 extends from the opposite side of pistons 14 through a second slot 56 in base 10, slot 56 being of like configuration and substantially parallel with slot 52. Reciprocably movable arm 58 is rotatably mounted on shaft 46. Arm 58 has an irregularly shaped opening 60 therein, through which shaft 50 extends. As best seen in FIG. 9, as piston 14 is moved from left to right shaft 50 will contact one side of opening 60 after piston 14 has been moved a short distance. Further movement of piston 14 causes shaft 50 to move arm 58 about its pivotal mounting on shaft 46. As arm 58 passes the central position of its movement it is biased by spring 62 immediately into the position indicated by FIG. 2. The movement of arm 58 is limited at one end of its travel by stop 64, preferably of a material such as rubber to provide a more resilient stop and to reduce noise, mounted on base 10 by any convenient means such as screw 66. The movement of arm 58 is likewise limited at the opposite end of its travel by stop 68 mounted on base 10 by screw 70. It should be noted that opening 60 is large enough and of such configuration that as arm 58 passes its central position, with shaft 50 in contact with the right side of opening 60 as viewed in FIG. 2, and is moved quickly into contact with stop 64.

Fixedly attached to the forward side of arm 58 for rotation therewith is circular member 72 having a raised portion 74 thereon. A V-shaped notch 76 is cut radially in raised portion 74. Within notch 76 are the end of shaft 46 and an arm 78 extending radially therefrom. As arm 58 is reciprocally rotated by the action of shaft 50 and spring 62, arm 78 and shaft 46 will be rotated in like manner.

A portion of the periphery of circular member 72 is toothed to form gear segment 80. Circular member 82 is rotatably mounted on screw 84 and has a gear segment 86 which meshes with gear segment 80. Thus, rotation of arm 58 causes rotation of circular member 82 in the opposite direction. Spring 62 is mounted at one end of washer 88 which loosely engages a pin 90 on arm 58. The other end of spring 62 is mounted on washer 92 which engages pin 92 on circular member 82. Both ends of spring 62 are thus moved by rotation of arm 58, which has the effect of moving the axis of the coil of spring 62 linearly as well as pivotally, thus causing the toggle action of spring 62 to move arm 58 even more quickly through the latter part of its travel.

Figure 8:
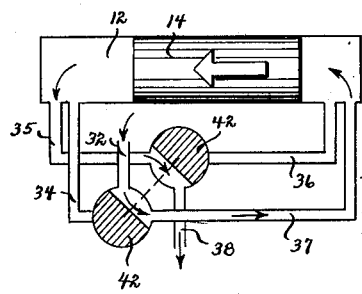
FIG. 8 is a diagrammatic view of the valve system when the piston is moving to the left.

The operation of valve member 42 may be seen by reference to diagrammatic FIGS. 7 and 8 wherein the opposite ends of valve member 42 are shown separately. Valve member 42 is substantially cylindrical in form having notches or cut-away portions in predetermined areas thereof. The configuration of these portions is such that when valve member 42 is in a first position (as shown in FIG. 7) inlet passageway 32 communicates through chamber 30 with passageway 34, and outlet passageway 38 communicates through chamber 30 with passageway 36. Thus, a fluid entering through inlet passageway 32 passes through the cut-away portion of valve member 42 in alignment therewith, through passageway 34 and into the left side of bore 12 as viewed in FIG. 7. Thus causes movement of piston 14 from left to right, forcing the fluid in the right side of bore 12 out through passageway 36, through the cut-away portion of valve member 42 in alignment therewith, and through outlet passageway 38. As piston 14 moves toward the right, shaft 50 contacts the right side of opening 60 and causes rotation of arm 58, as previously described. As arm 58 passes the central position of its motion spring 62 causes it to move quickly to the limit of its travel, quickly rotating shaft 46 and moving valve member 42 to a second position. In the second position of valve member 42 (FIG. 8) the cut-away portion formerly in alignment with inlet passageway 32 and passageway 34, allowing the fluid to pass from the former into the latter, is moved away from its first position and valve member 42 effectively seals these two passageways from mutual communication. Likewise, the nitch formerly in alignment with passageway 36 and outlet passageway 38 moves out of alignment and allows valve member 42 to seal these two passageways. The cut-away portion now in registration with inlet passageway 32 (in the second position of valve member 42) causes it to communicate with passageway 37, and the cut-away portion in registration with outlet passageway 38 causes it to communicate with passageway 35. Fluid entering through inlet passageway 32 thus passes into chamber 30, through the cut-away portion of valve member 42 in alignment with inlet passageway 32, through passageway 37 and into the right end of bore 12 as viewed in FIG. 7. This causes movement of piston 14 from right to left, forcing the fluid in the left side of bore 12 out through passageway 35 and into chamber 30, through the cut-away portion in valve member 42 in registration with passageway 35 and out through outlet passageway 38. As piston 14 moves from right to left, shaft 50 contacts the left side of opening 60 and causes rotation of arm 58 away from the position illustrated by FIG. 2. Again, as arm 58 passes the central position it is quickly moved to the left limit of its travel by spring 62, rotating shaft 46 and returning valve member 42 to its first position. It is to be noted that the movement of valve member 42 between its first and second positions is essentially instantaneous, taking place during the time that arm 58 is moved from the central position of its travel into contact with either stop 64 or stop 68 under the strong bias of spring 62. Upon movement of valve member 42 from one position to the other, the fluid immediately begins to flow into the opposite end of bore 12 causing reverse motion of piston 14. Shaft 50 then traverses opening 60, contacts the opposite side thereof, and rotates arm 58 to its central position where the action of spring 62 takes over. The stroke of piston 14 is governed largely by the size and configuration of opening 60. Also, the shape of opening 60 is such that as shaft 50 moves into contact with the sides thereof it meets the sides at a slight angle, having the effect of sliding into contact with the sides rather than meeting them straight on, thus reducing wear and noise.

As previously stated the flow of fluid through inlet line 28 is governed by valve controls, the operation of which will now be described. Valve housing 100 contains a conventional one-way valve 102, best seen in FIG. 5 where it is shown in the fully closed position. Valve 102 is mounted on shaft 104 which is slidingly engaged in a guide hole 106 in top cap 108 of valve housing 100. Valve 102 is biased toward the closed position by spring 110 which encircles shaft 104. The lower side of valve 102 rests on valve lifter 112 which is interposed in the opening 114 of valve housing 100 which is sealed by valve 102. Valve lifter 112 has as its lower end a small tip 116 which rests on a function generator or continuous circular cam element 118. Cam 118 is fixedly mounted on shaft 120 for rotation therewith. One end of shaft 120 extends through cap 122 which is threaded into one side of housing 124 to seal the end thereof.

The numeral 128 designates a bearing bracket on the front right side of the housing 10. The numeral 130 designates a control plate slidably mounted on the bracket 128 by having a horizontal slot 132, through which cap screws 134 extend and which are threaded into the bracket 128 as shown in FIG. 1. The numeral 136 designates a slot in the plate 130. This slot extends first forwardly to the left then is curved downwardly and to the left, and then extends forwardly and upwardly to the left as shown in FIG. 2. The numeral 138 designates a pin on the free end of the lever arm 126, and which is slidably mounted in the slot 136. A finger spring 140, having one end connected to the plate 130 yieldingly retains the pin 138 in the right end of the slot 136. The numeral 142 designates a control rod secured to the plate 130 for horizontally sliding the plate 130 forwardly or rearwardly relative to the housing 10. When the plate 130 is in a rear position to the right as shown in FIG. 1, the arm 126 will be extending upwardly and to the right, the pin 138 will be in the upper left forward area of the slot 136, and the valve 102 will be in open condition by virtue of the cam 118. Fluid under pressure will move through the conduit 32. However, when the plate 130 is pushed forwardly to the left, as shown in FIG. 2, the arm 126 will extend downwardly and to the right, the pin 138 will be in the rear right end of the slot, and the valve 102 will be in a substantially closed position. Extending forwardly and to the left on the plate 130 is a projection 144 and which has a vertical shoulder 146. The numeral 148 designates a rectangular lug hinged at its upper right end to the projection 144, and is limited in its downward swinging movement by coming into contact with the shoulder 146. This rectangular lug 148 may swing forwardly and upwardly. The forward underside of the projection 144 and underside of the lug 148 are curved as shown in FIG. 1.

Obviously when the arm plate 58 is in the extreme position to the right, the rotatable valve 42 will pass pressure fluid into the right edge of the cylinder 12. To move the wiper elements to an inward semi-parked position, the shaft 50 must be in the right end area of the slot 52. To stop the device the plate 130 is moved forwardly to the left. If the plate 130 were moved forwardly while the arm 58 were to the right and adjacent the bumper 64, the remaining fluid pressure would enter the right end of the cylinder 12, and the shaft 50 would objectionably move to the right. Therefore to solve this problem, the arm 58 is permitted to swing to the left as the fluid pressure fills up the cylinder to the right of the piston 19. The top of the arm 58 will pass under the forward end of the projection 144, tip up and pass from under the lug 148 and continue its swinging movement to the left (carried in that direction by the movement of the shaft 50 to the left).

The arm 58, will toggle to the left, rotating the valve 42 and causing the fluid pressure to build up in the left end of the cylinder 12. This pressure build up will move the piston and shaft 50 to the right and toward a semi-parked position. Thus, regardless of when the control plate 130 is moved forwardly to the left, the piston and shaft 50, will end up in a position to the right. The cycle cannot be repeated, because with the plate 130 in a forward position, the lug 148 will be in the path of the returning arm 58, as shown in FIG. 2. This means that the valve 42 will not be so opened to permit fluid pressure to enter the right end area of the cylinder 12.

Figure 11:
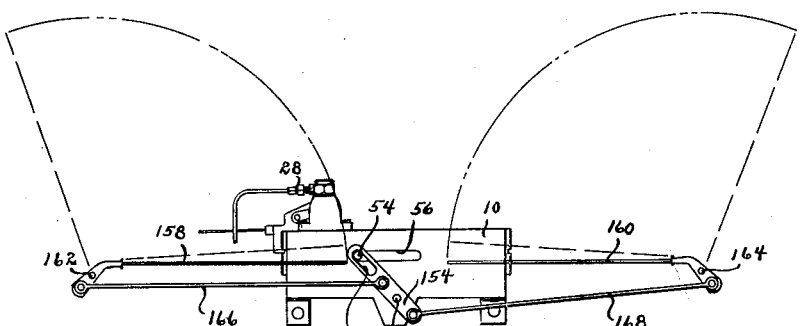
FIG. 11 is a rear elevational diagrammatical view of the device used to actuate the windshield wiper arms of an automotive vehicle.

At this stage the piston 14 will be at its normal reciprocation to the right, and the wiper elements will be in lowered positions of the windshield, but not "parked." Therefore to get the wiper elements from such semi-parked positions into full parked positions as shown in FIG. 11, it is necessary that the piston 14 continue to the right and beyond its normal reciprocation. To accomplish this, the various parts and elements are so arranged that both the valve means 102, and 42 remain slightly open to permit a small amount of fluid pressure to flow into the right end area of the cylinder as shown in FIG. 9, With the piston 14 at an extreme position to the right, as shown in FIG. 3 and FIG. 9, the shaft 54 will also be at an extreme position to the right and the wiper elements will be full parked.

To again start the device, it is merely necessary to move the control plate 130 to the right as shown in FIG. 1.

The valve 102 will be opened thereby and the lug 148 will be moved away from the path of the arm 58. The speed of the device will depend on the amount of opening of the valve 102 and this is accomplished by moving the control plate 130, i.e., the farther the control plate 130 is moved to the right, the faster the speed of operation. The lug 148 acts as a one way ratchet means for limiting the movement of the arm 58 in one direction.

The end of control wire 142 to be moved (not shown) may terminate in the usual control button or other element which may be mounted, as on the dash panel of a vehicle, to move in any manner desired for imparting motion to control wire 142 and thence to actuator arm 126.

As may be seen from FIG. 4 when cam 118 is rotated in a clockwise direction the rise of the cam causes valve lifter 112 to rise, thus opening valve 102. The farther cam 118 is rotated in a clockwise direction as viewed in FIG. 2, the farther valve lifter 112 will be raised and the wider valve 102 will be opened. The configuration of valve lifter 112 is such that when valve 102 is open fluid may flow through opening 114 without being completely obstructed by valve lifter 112. Wider opening of valve 102 will allow a faster rate of flow of a fluid under relatively constant pressure supplied from inlet line 28. Movement of control wire 142 to rotate actuator arm 126, arm 134 and cam 118 controls the opening of valve 102, the rate of flow of the fluid, and hence the speed of operation of the reciprocating mechanism.

Referring again to FIG. 11, the apparatus is seen from the opposite side as that shown in FIGS. 8 and 9. The end of shaft 54 may be seen extending through slot 56 in base 10, and thence through a second slot 152 in arm 154 which is pivotally mounted at 156 upon a lower portion of base 10. Two conventional vehicle windshield wiper blades 158 and 160, pivotally mounted at 162 and 164 respectively, are connected by rods 166 and 168 to arm 154 on opposite sides of pivotal mounting 156. As piston 14 reciprocates back and forth shaft 54 will reciprocally rotate arm 154, resulting in the reicprocating arcuate motion of wiper blades 158 and 160. The previously described means for moving valve member 42 between first and second positions in a substantially instantaneous manner results in continuous, automatic and uniform reciprocating motion of wiper blades 158 and 160. The speed of movement may be continuously adjusted in a simple manner through the use of the cam-lifted valve and elements associated therewith. Also, the elements normally stop each time in the same position through action of the elements of the apparatus themselves to effect closure of the valve.

As hereinbefore indicated, the valve means 102 is never completely closed. This, however, is only true under normal operating conditions wherein the plate 130 is moved either to its extreme forward position or extreme rear position. Herebefore the path of the slot 136 has been described. It will be noted that this slot 136 extends first downwardly to the left and then upwardly and forwardly to the left. When the shaft 138 is in the lowest position in the slot 136, the valve 102 will be completely closed, but when the shaft 138 is in this position the plate 130 will not be completely pulled to the rear or pushed forwardly to its maximum forward position. The reason for this is that if an operator so desires he can stop the wiper blades at any desired position merely by moving the plate 130 slightly to the rear but left of its extreme forward position. This may be desirable for two or more reasons. Firstly, if the operator wishes to close all fluid passing through the device, he can do it and, secondly, there are occasions when he may wish the wipers to be in positions other than "park." This is especially true in winter time when the operator does not wish to have the inactive wiper blades freeze by ice to the windshield frame. He can prevent this by stopping the wiper blade at positions higher on the windshield. In normal operation, however, the operator will invariably push the plate 130 to its extreme forward position, but as before described this will prevent leakage of fluid through the device and effect the positioning of the wipers in parked positions. When the plate 130 is moved to such normal forward position for shutting off the device, the shaft 138 will be raised into the rear end of the slot 136 and the valve means 102 will be slightly opened for permitting a small amount of fluid to pass through the device and park the wiper blades. It will be noted that when the device is in condition, as shown in FIG. 2, the plate 58 will be in a neutral position and the pin 78 will not be toggled to the right. However, when the device is started by moving the plate 130 to the left, the spring 62 will pull the plate 58 rapidly to the right and the pin 78 will be flipped to the right, and the sequence of operation of the device will commence. If an operator wishes to completely close the valve means 102 he is able to obtain visual proof that the valve means 102 is completely closed by noting the positions of the wiper blades. If these wiper blades are not in parked positions, then he knows that the valve means 102 is completely closed. If, after the wiper blades are in parked positions and therefore are no longer an indicator as to the position of valve 102, it is merely necessary for the operator to move the plate 130 a fraction of an inch to the right in order to bring the shaft 138 into the lowermost curvature of the slot 136. In most all cases, however, the operator will desire a slight leakage of the fluid through the device at all times so that the device will be in continuous condition for instantaneous operation. Also, by slight leakage of the fluid through the device, the fluid will be in a warm condition and the device will function properly regardless of temperatures.

Some changes may be made in the construction and arrangement of my fluid actuated reciprocating mechanism and controls therefor without departing from the real spirit and purpose of my invention, and it is my intention to cover by my claims, any modified forms of structure or use of mechanical equivalents which may be reasonably included within their scope.

I claim:

1. A fluid pressure actuated reciprocating mechanism, comprising in combination:
   a housing having a hollow bore therein,
   at least one piston reciprocably movable in said bore,
   at least one passageway in said housing communicating with said bore,
   a valve member movable between first and second positions and so constructed and arranged that when in said first position said passageway communicates therethrough with a source of fluid under pressure, and when in said second position said passageway communicates with means for discharging said fluid from said housing, whereby said piston is moved by said fluid in a first direction when said valve means is in said first position and in a second direction when said valve means is in said second position,
   spring loaded toggle means partially movable by movement of said piston to a predetermined position wherein said toggle means is tripped by the spring loading thereon, and
   a member operatively connected to said valve member and movable in response to tripping of said toggle means to cause movement of said valve member between said first and second positions,
   and a rotatably movable member capable of assuming a position for limiting the movement of said spring loaded toggle means in one direction.

2. A fluid pressure actuated reciprocating mechanism, comprising in combination:
   a housing having a hollow bore therein,
   at least one piston reciprocably movable in said bore,
   at least one passageway in said housing communicating with said bore,
   a valve member movable between first and second positions and so constructed and arranged that when in said first position said passageway communicates therethrough with a source of fluid under pressure, and when in said second position said passageway communicates with means for discharging said fluid from said housing, whereby said piston is moved by said fluid in a first direction when said valve means is in said first position and in a second direction when said valve means is in said second position,
   spring loaded toggle means partially movable by movement of said piston to a predetermined position wherein said toggle means is tripped by the spring loading thereon, and
   a member operatively connected to said valve member and movable in response to tripping of said toggle means to cause movement of said valve member between said first and second positions,
   and a movable member capable of assuming a position for limiting the movement of said spring loaded toggle means in one direction; said valve member being only partially closed when said spring loaded toggle means is limited in its movement in one direction by said movable member.

3. A fluid pressure actuated reciprocating mechanism, comprising in combination:
   a housing having a hollow bore therein,
   at least one piston reciprocally movable in said bore,
   at least one passageway in said housing communicating with said bore,
   a valve member movable between first and second positions and so constructed and arranged that when in said first position said passageway communicates therethrough with a source of fluid under pressure, and when in said second position said passageway communicates with means for discharging said fluid from said housing, whereby said piston is moved by said fluid in a first direction when said valve means is in said first position and in a second direction when said valve means is in said second position,
   spring loaded toggle means partially movable by movement of said piston to a predetermined position wherein said toggle means is tripped by the spring loading thereon, and
   a member operatively connected to said valve member and movable in response to tripping of said toggle means to cause movement of said valve member between said first and second positions,
   and a movable member having ratchet means capable of assuming a position for limiting the movement of said spring loaded toggle means in one direction.

4. A fluid pressure actuated reciprocating mechanism, comprising in combination:
   a housing having a hollow bore therein,
   at least one piston reciprocally movable in said bore,
   at least one passageway in said housing communicating with said bore,
   a valve member movable between first and second positions and so constructed and arranged that when in said first position said passageway communicates therethrough with a source of fluid under pressure, and when in said second position said passageway communicates with means for discharging said fluid from said housing, whereby said piston is moved by said fluid in a first direction when said valve means is in said first position and in a second direction when said valve means is in said second position,
   spring loaded toggle means partially movable by movement of said piston to a predetermined position wherein said toggle means is tripped by the spring loading thereon, and a member operatively connected to said valve member and movable in response to tripping of said toggle means to cause movement of said valve member between said first and second positions, and a movable member having a ratchet means capable of assuming a position for limiting the movement of said spring loaded toggle means in one direction; said valve member being only partially closed when said spring loaded toggle means is limited in its movement in one direction by said ratchet means.

5. A fluid pressure actuated reciprocating mechanism comprising, in combination:

a housing having a hollow bore therein,
at least one piston reciprocally movable in said bore,
at least one passageway in said housing communicating with said bore,
a valve member movable between first and second positions and so constructed and arranged that when in said first position said passageway communicates therethrough with a source of fluid under pressure, and when in said second position said passageway communicates with means for discharging said fluid from said housing, whereby said piston is moved by said fluid in a first direction when said valve means is in said first position and in a second direction when said valve means is in said second position,
spring loaded toggle means movable by movement of said piston to a predetermined position wherein said toggle means is tripped by the spring loading thereon,
a regulating valve imposed in the path of said fluid incapable of stopping all the flow of said fluid to said first mentioned valve member, and
a movable member capable of assuming a position for limiting the movement of said spring loaded toggle means in one direction.

6. A fluid pressure actuated reciprocating mechanism comprising, in combination:

a housing having a hollow bore therein,
at least one piston reciprocally movable in said bore,
at least one passageway in said housing communicating with said bore,
a valve member movable between first and second positions and so constructed and arranged that when in said first position said passageway communicates therethrough with a source of fluid under pressure, and when in said second position said passageway communicates with means for discharging said fluid from said housing, whereby said piston is moved by said fluid in a first direction when said valve means is in said first position and in a second direction when said valve means is in said second position,
spring loaded toggle means movable by movement of said piston to a predetermined position wherein said toggle means is tripped by the spring loading thereon,
a regulating valve imposed in the path of said fluid incapable of stopping all the flow of said fluid to said first mentioned valve member, and
a movable member having a ratchet means capable of assuming a position for limiting the movement of said spring loaded toggle means in one direction.

7. A fluid pressure actuated reciprocating mechanism comprising, in combination;

a housing having a hollow bore therein,
at least one piston reciprocably movable in said bore,
at least one passageway in said housing communicating with said bore,
a valve member movable between first and second positions and so constructed and arranged that when in said first position said passageway communicates therethrough with a source of fluid under pressure, and when in said second position said passageway communicates with means for discharging said fluid from said housing, whereby said piston is moved by said fluid in a first direction when said valve means is in said first position and in a second direction when said valve means is in said second position,
spring loaded toggle means movable by movement of said piston to a predetermined position wherein said toggle means is tripped by the spring loading thereon,
a regulating valve imposed in the path of said fluid incapable of stopping all the flow of said fluid to said first mentioned valve member, and
a movable member having a ratchet means capable of assuming a position for limiting the movement of said spring loaded toggle means in one direction; said valve member being only partially closed when said spring loaded toggle means is limited in its movement in one direction by said ratchet means.

8. A fluid pressure actuated reciprocating mechanism comprising, in combination:

a housing having a hollow bore therein,
at least one piston reciprocably movable in said bore,
at least one passageway in said housing communicating with said bore,
a valve member movable between first and second positions and so constructed and arranged that when in said first position said passageway communicates therethrough with a source of fluid under pressure, and when in said second position said passageway communicates with means for discharging said fluid from said housing, whereby said piston is moved by said fluid in a first direction when said valve means is in said first position and in a second direction when said valve means is in said second position,
spring loaded toggle means movable by movement of said piston to a predetermined position wherein said toggle means is tripped by the spring loading thereon,
a regulating valve imposed in the path of said fluid incapable of stopping all the flow of said fluid to said first mentioned valve member, and
a movable member operatively connected to said regulating valve and capable of assuming a position for limiting the movement of said spring loaded toggle means in one direction.

9. A fluid pressure actuated reciprocating mechanism according to claim 8 wherein the operative engagement between said rotatable member and said toggle arm comprises meshing gear teeth on at least portions of the peripheries of both said rotatable member and said toggle arm.

References Cited in the file of this patent

UNITED STATES PATENTS

| | | |
|---|---|---|
| 2,032,319 | Horton et al. | Feb. 25, 1936 |
| 2,240,381 | Sibley | Apr. 29, 1941 |
| 2,378,320 | O'Shei | June 12, 1945 |
| 2,584,229 | Sacchini | Feb. 5, 1952 |
| 2,664,074 | O'Shei | Dec. 29, 1953 |
| 2,945,480 | Toman | Sept. 19, 1960 |